Figure 9:
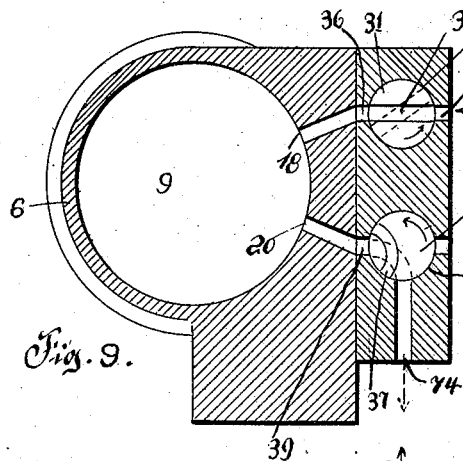

No. 849,861. PATENTED APR. 9, 1907.
T. SHADE.
VALVE GEAR FOR ENGINES.
APPLICATION FILED APR. 23, 1906.
6 SHEETS—SHEET 1.
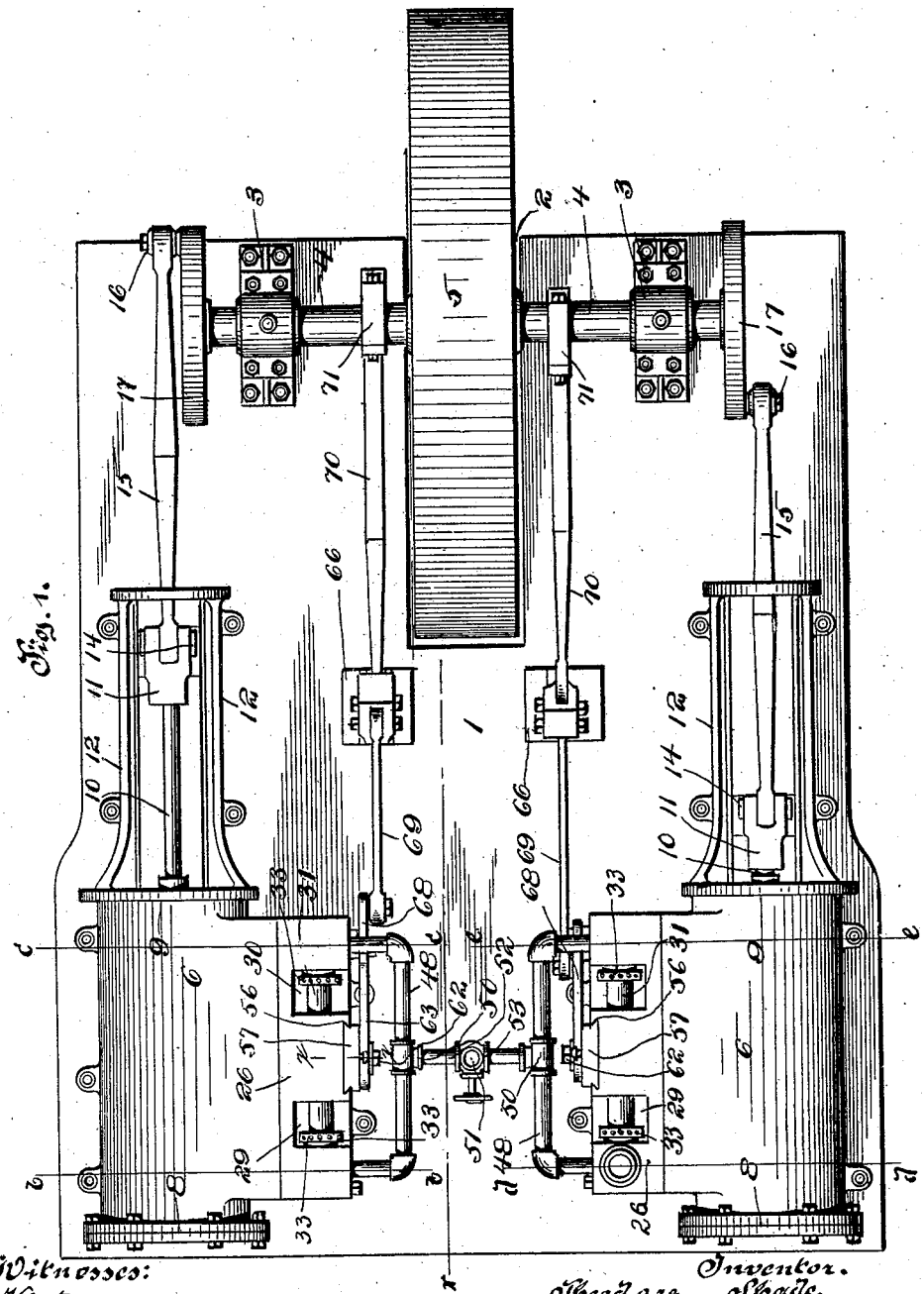

No. 849,861. PATENTED APR. 9, 1907.
T. SHADE.
VALVE GEAR FOR ENGINES.
APPLICATION FILED APR. 23, 1906.
6 SHEETS—SHEET 2.
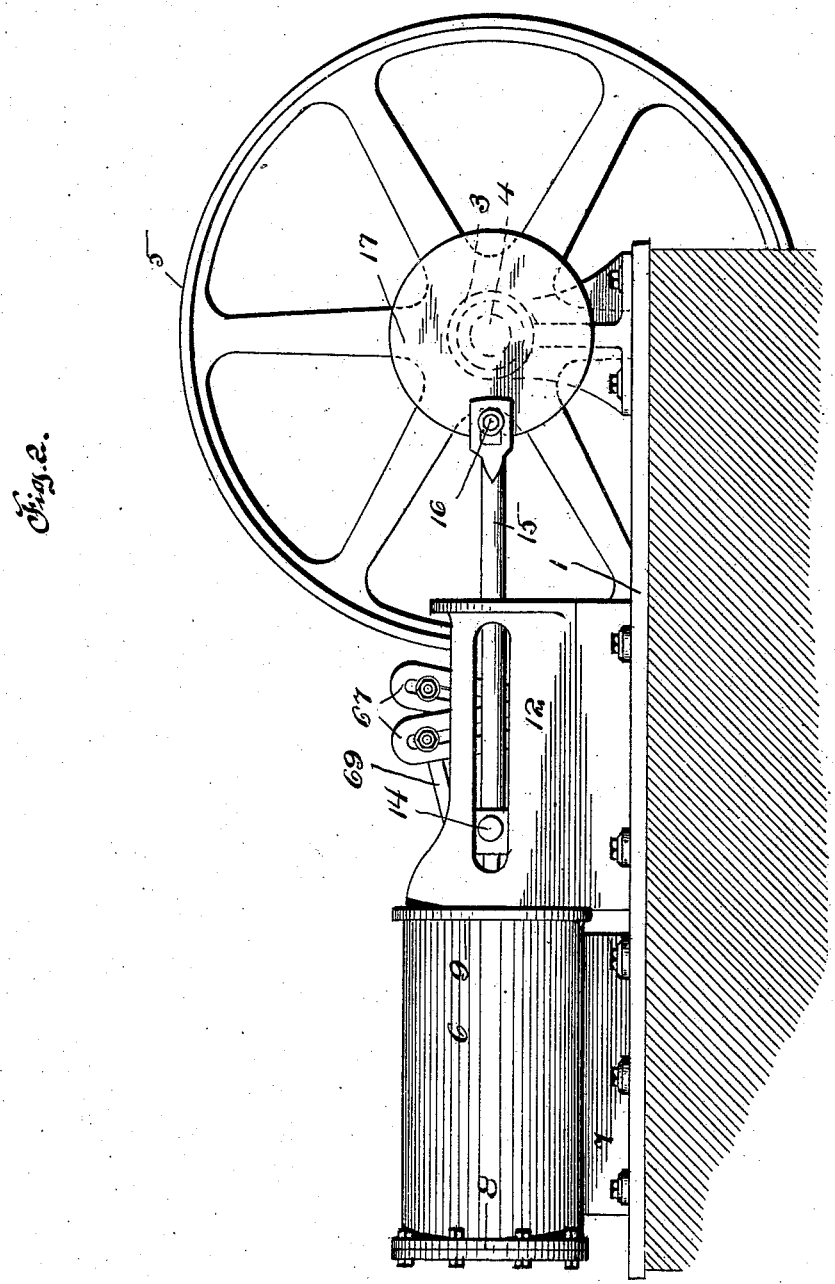

No. 849,861. PATENTED APR. 9, 1907.
T. SHADE.
VALVE GEAR FOR ENGINES.
APPLICATION FILED APR. 23, 1906.
6 SHEETS—SHEET 3.
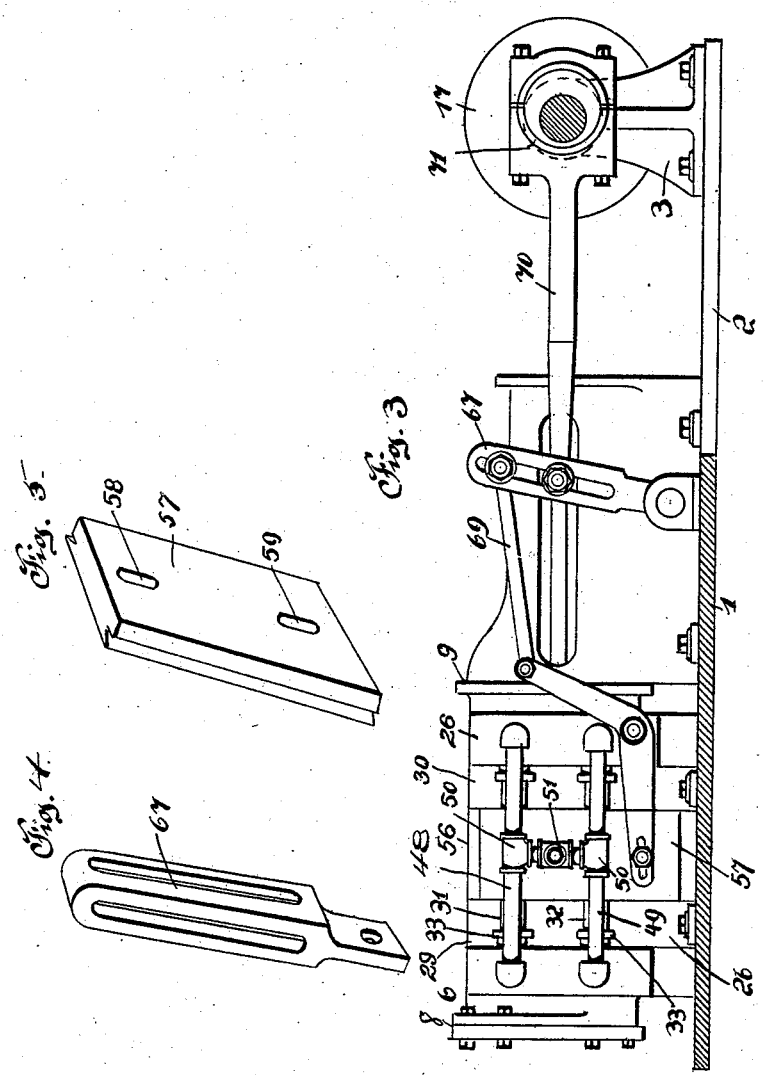

No. 849,861. PATENTED APR. 9, 1907.
T. SHADE.
VALVE GEAR FOR ENGINES.
APPLICATION FILED APR. 23, 1906.
6 SHEETS—SHEET 4.
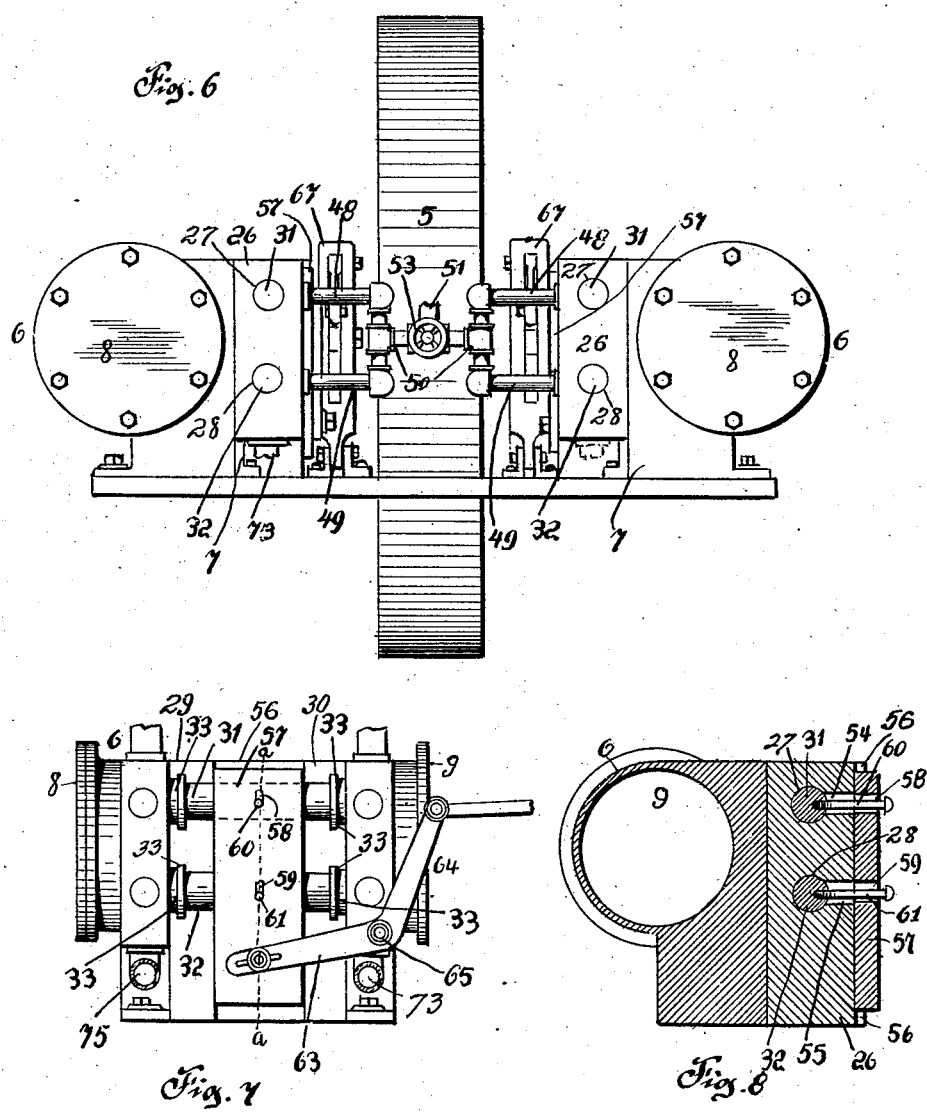

No. 849,861. PATENTED APR. 9, 1907.
T. SHADE.
VALVE GEAR FOR ENGINES.
APPLICATION FILED APR. 23, 1906.

6 SHEETS—SHEET 5.

Witnesses:
C. Klostermann
J. N. Butler

Inventor.
Theodore Shade.
by N. C. Everts & Co.
Attorneys.

THE NORRIS PETERS CO., WASHINGTON, D.C.

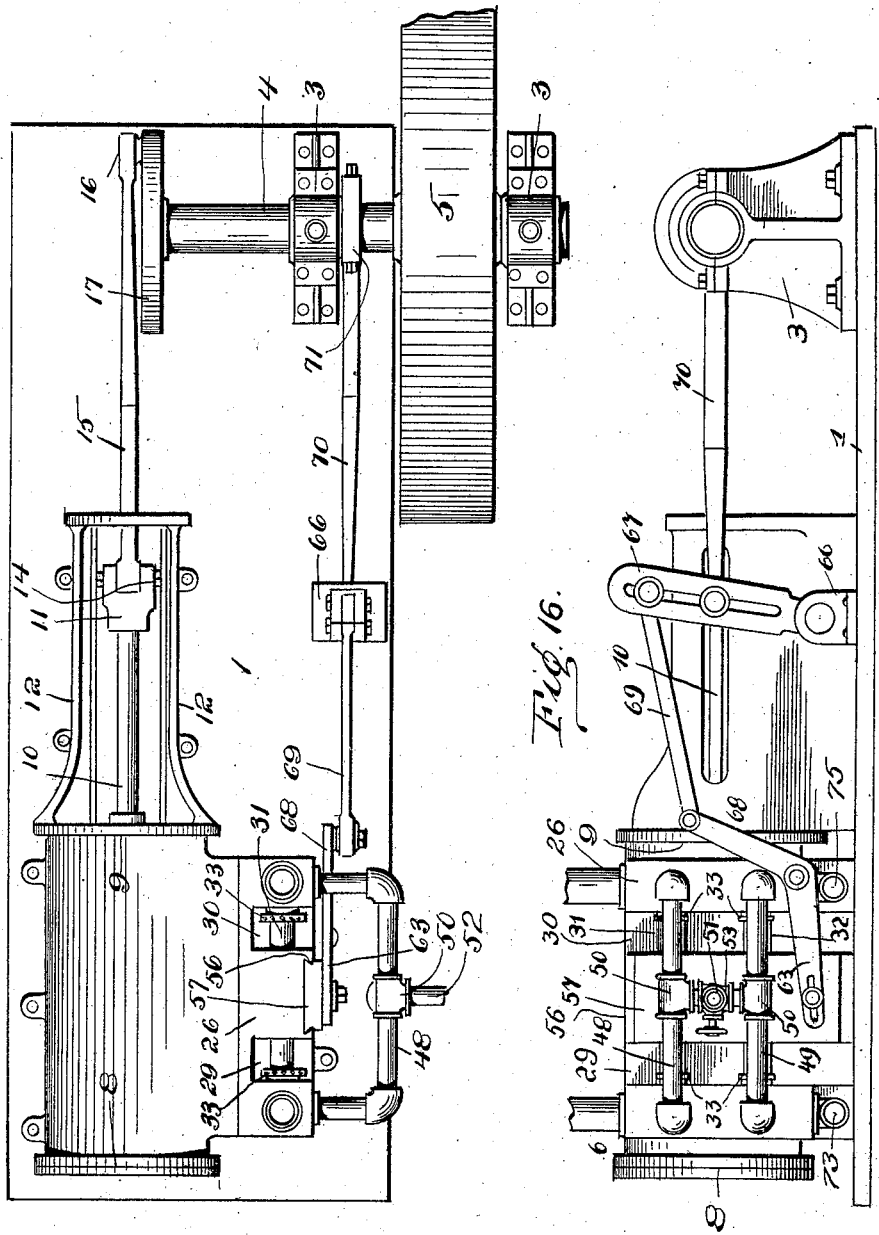

UNITED STATES PATENT OFFICE.

THEODORE SHADE, OF GREENSBURG, PENNSYLVANIA, ASSIGNOR TO JOHN WILSON GIFFEN, OF GREENSBURG, PENNSYLVANIA.

VALVE-GEAR FOR ENGINES.

No. 849,861.  Specification of Letters Patent.  Patented April 9, 1907.

Application filed April 23, 1906. Serial No. 313,206.

*To all whom it may concern:*

Be it known that I, THEODORE SHADE, a citizen of the United States of America, residing at Greensburg, in the county of Westmoreland and State of Pennsylvania, have invented certain new and useful Improvements in Valve-Gear for Engines, of which the following is a specification, reference being had therein to the accompanying drawings.

This invention relates to certain new and useful improvements in engines; and the invention relates more particularly to the valve mechanism of the cylinders of an engine.

The primary object of this invention is to provide positive and reliable means for perfectly controlling the inlet-ports of a cylinder and the exhaust-ports thereof. To this end I have designed an engine of a single-cylinder type wherein the conventional form of slide-valve heretofore employed for directly controlling the ports of a cylinder is dispensed with, and in lieu of said slide-valve I have devised revoluble means for effectually controlling the ports of a cylinder. In this connection I have constructed an engine from which a maximum amount of efficiency and power may be derived from a minimum expenditure of steam, the ports of the cylinders of my improved engine being so positively controlled as to provide a smoothly-running engine wherein each and every part coöperates to provide a novel and effective engine.

With the above and other objects in view, which will more readily appear as the nature of the invention is better understood, the same consists in the novel construction, combination, and arrangement of parts to be hereinafter more fully described and claimed, and referring to the drawings accompanying this application like numerals of reference designate corresponding parts throughout the several views, in which—

Figure 10:
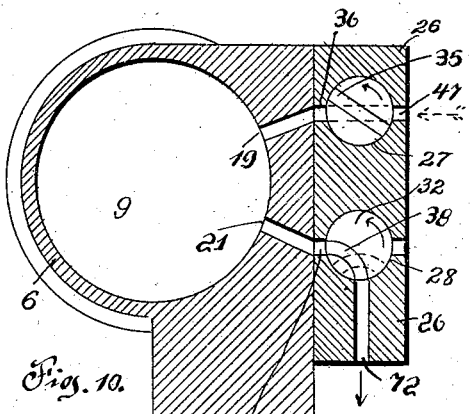
Figure 11:
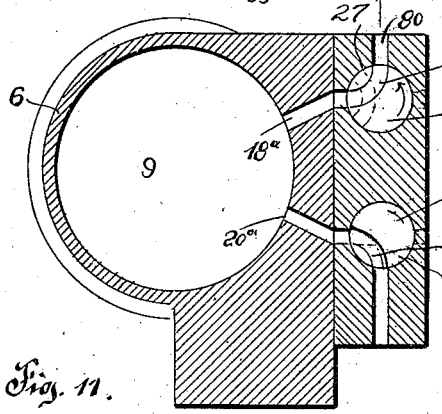
Figure 12:
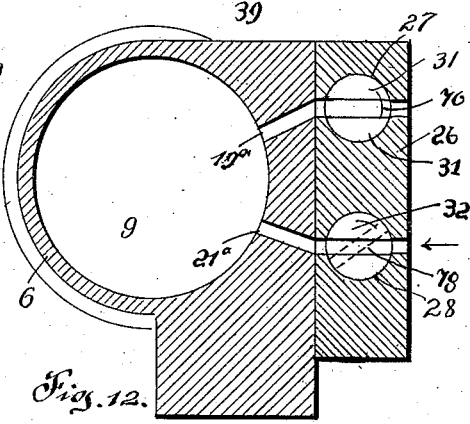
Figure 14:
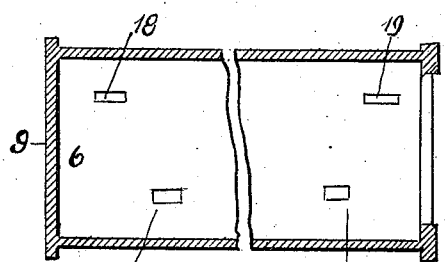
Figure 13:
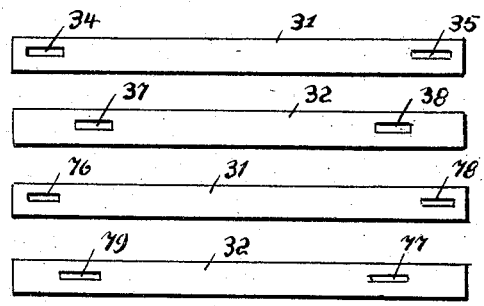

Figure 1 is a plan of an engine constructed in accordance with my invention. Fig. 2 is a side elevation of the same. Fig. 3 is a longitudinal sectional view taken on the line $x$ $x$ of Fig. 1. Fig. 4 is a perspective view of one of the oscillating levers of the engine. Fig. 5 is a perspective view of one of the vertically-reciprocating plates. Fig. 6 is a rear end view of my improved engine. Fig. 7 is a side elevation of one of the cylinders thereof. Fig. 8 is a cross-sectional view of one of the cylinders, taken on the line $a$ $a$ of Fig. 7. Fig. 9 is a cross-sectional view taken on the line $b$ $b$ of Fig. 1. Fig. 10 is a similar view taken on the line $c$ $c$ of Fig. 1. Fig. 11 is a cross-sectional view of a portion of the cylinder, taken on the line $b$ $b$ of Fig. 1. Fig. 12 is a similar view taken on the line $e$ $e$ of Fig. 1. Fig. 13 is a plan of the two sets of revoluble cylindrical valves used in connection with my improved engine. Fig. 14 is a sectional view of a portion of a cylinder constructed in accordance with my invention. Fig. 15 is a plan of a single-cylinder engine constructed in accordance with my invention. Fig. 16 is a side elevation of the same.

In the accompanying drawings I have illustrated two types of an engine—a single-cylinder engine and a twin or two coupled engine; but in both instances the cylinders and operating mechanism of the engines are identical, the double engine simply representing a duplication of the cylinder and operating mechanism of the single engine. Therefore I deem it only necessary to describe the detail construction and operation of a single-cylinder engine; but in doing so reference will be had to Fig. 1, and particularly to one of the cylinders and the operating mechanism thereof.

In putting my invention into practice I construct my improved engine of a bed-plate 1, one end of which cut away, as at 2. Upon each side of the cut-away portion of the bed-plate I erect two journal-boxes 3 3 of a conventional form, in which is journaled a driven shaft 4, said shaft being provided with a large balance-wheel 5, which extends downwardly in the cut-away portion of the bed-plate 1. Upon each side of the bed-plate 1, at the opposite end thereof, I mount a cylinder 6, said cylinder having a flanged body portion 7 depending therefrom, the cylinder having heads 8 and 9. In the cylinder 6 is mounted a conventional form of piston, (not shown,) which connects with a piston-rod 10, that extends through the head 9 and connects with a cross-head 11, said cross-head being guided in its movement to and fro by cross-head guides 12 12. The cross-head 11 is connected by a coupling-pin 14 to a connecting-rod 15, said connecting-rod having its opposite end encircling the crank-pin 16, carried by a crank-disk 17, keyed upon the end of the driven shaft 4.

The cylinder 6 is provided with four ports 18 19 20 21, two of the ports being arranged at each end of the cylinder. The ports are all formed upon one side of the cylinder, the ports 18 and 19 serving as inlet-ports and the ports 20 and 21 as exhaust-ports.

Suitably secured to the side of the cylinder 6 is a head 26, said head being provided with longitudinally-disposed bores 27 and 28, the bore 27 being arranged directly above the bore 28 and in a plane parallel with the ports 18 and 19, while the bore 28 is in a plane parallel with the bores 20 and 21 of the cylinder 6. The bores 27 and 28 are intersected by vertically-disposed slots 29 and 30.

In the ports 27 and 28 are mounted revoluble cylindrical valves 31 and 32, these cylindrical valves passing through stuffing-boxes 33 33, carried by the head 26. The cylindrical valve 31 is provided with ports 34 and 35 near its ends, said ports being adapted to register with the ports 18 and 19 of the cylinders 6 through the medium of the the ports 36 36, formed in the head 26. The valve 32 is provided with ports 37 and 38 near its ends, said ports registering with the ports 20 and 21 of the cylinder 6 through the medium of ports 39, formed in the head 26. The head 26 is also provided with ports 47, which establish communication between the bores 27 and 28 and the inlet-pipes 48 and 49, said pipes being connected together by a coupling 50 and connecting with a main supply-pipe 51 by a connection 52, the main supply-pipe being provided with a conventional form of controlling-valve 53.

The head 26 intermediate the slots 29 and 30 is provided with two horizontal openings 54 and 55, said openings being arranged one above the other and communicating with the bores 27 and 28. The outer side of the head 26 is provided with a vertically-disposed groove 56, and in said groove is mounted a vertically-reciprocating plate 57, said plate being slotted, as at 58 and 59, said slots registering with the openings 54 and 55 of the head 26. The valves 31 and 32 are provided with outwardly-extending headed pins 60 and 61, the pin 60 extending through the opening 54 and the slot 58, while the pin 61 extends through the opening 55 and the slot 59 of the head 26 and the plate 57, respectively. The lower end of the plate 57 is provided with an outwardly-extending pin 62, and mounted upon said pin is a slotted arm 63 of a bell-crank lever 64, said lever being pivotally mounted upon the head 26, as at 65.

The bed-plate 1 is provided with a bearing 66, in which is mounted a slotted oscillating lever 67. The oscillating lever 67 is adjustably connected to the arm 68 of the bell-crank lever 64 by a link 69. The lever 67 is oscillated through the medium of a connecting-rod 70, carried by an eccentric 71, mounted upon the driven shaft 4 of my improved engine.

Operation: Assuming that the engine is in operation, the eccentric 71 is adapted to oscillate the lever 67 and through the medium of the bell-crank lever 68 reciprocate the plate 57. The reciprocating plate 57 imparts a rocking or revoluble movement to the valves 31 and 32. Assuming that the cylinder 6 is taking steam from the pipe 48 through port 47, port 34 of the valve 31, ports 36 and 18, the piston will be forced to the forward end of the cylinder, at which time the steam exhausts through ports 21 and 39, port 38 of the valve 32, and port 72 of the head 26, the last-named port being provided with a suitable exhaust-pipe 73. When the plate 57 is again reciprocated, (moved down,) the valves 31 and 32 are partially rotated, which throws the port 34 out of communication with the port 18 of the cylinder and moves the port 35 into communication with the port 19 of the cylinder, the cylinder taking steam at this end to force the piston rearwardly, the steam exhausting through the port 37 of the valve 32, which has been moved to register with the ports 20 and 39. The steam exhausts from a port 74, similar to the port 72 heretofore described, said port being provided with an exhaust-pipe 75, similar to the pipe 73. The ports above referred to are clearly illustrated in Figs. 10 and 11 of the drawings, and in order that the operation of the cylinder on the opposite side of the bed-plate 1 may be clearly understood I have illustrated the arrangement of the ports of said cylinder in Figs. 12 and 13, the valves 31 and 32 of said cylinder being illustrated in Fig. 14. As the piston upon the one side of the engine works in a reverse direction to the piston upon the other side, it is necessary that the port 76 of the valve 31 admit steam to the cylinder through the port 18$^a$, the steam exhausting through port 20$^a$ of the cylinder and port 77 of the valve 32. To move the piston in a reverse direction, steam is admitted to the cylinder through port 78 of the valve 32 and port 21$^a$ of the cylinder, the steam exhausting through port 18$^a$ of the cylinder and port 79 of the valve 31.

In connection with the head 26 of the cylinder just described the ports 72 and 74 may be dispensed with, it being necessary to provide the head upon its upper face with an exhaust-port 80, said port communicating with the port 79 of the valve 31 when the cylinder is exhausting.

Such changes in the construction and operation of the engine as are permissible by the appended claims may be resorted to without departing from the spirit and scope of the invention.

What I claim, and desire to secure by Letters Patent, is—

1. In an engine, the combination with cylinders having ports therein, of heads carried by said cylinders, said heads having ports formed therein and registering with the ports of said cylinders, cylindrical valves mounted in said heads and controlling the ports of said cylinders, vertically-sliding plates carried by the sides of said cylinders, pins mounted in said cylindrical valves, and projecting through openings in said vertical sliding plates, thereby forming means by which said cylindrical valves are operated, a bell-crank lever carried by the cylinder-supporting means, a vertically-pivoted arm, a link connecting one extremity of said bell-crank lever with said vertical pivoted arm, the other end of said bell-crank lever pivoted on said vertically-sliding plate, a shaft operated by a piston carried within said cylinders, a lever pivotally mounted to said vertical arm, and eccentrically mounted on said shaft, for operating said vertically-sliding plate.

2. In an engine, the combination with a cylinder having exhaust-ports spaced from the ends and with intake-ports between the exhaust-ports and the ends of the cylinder, heads carried by said cylinder and provided with longitudinally-extending valve-bores and with ports corresponding to the exhaust-ports and intake-ports of the cylinder and registering therewith and with vertical guideways in its outer face, valves mounted for oscillation in said valve-bores and provided with transverse ports arranged for alternate registration with the ports in said cylinder and head, a plate slidable in said guideways, pins connected to said valves and extending through said slidable plate, a driven shaft adapted to be operated by the engine, an eccentric carried by said shaft, and coupling means between said eccentric and said slidable plate whereby the rotary motion of the shaft will cause the reciprocatory motion of the plate and cause the operation of the valves.

In testimony whereof I affix my signature in the presence of two witnesses.

THEODORE SHADE.

Witnesses:
J. W. GIFFEN,
K. H. BUTLER.